United States Patent

Matsuoka et al.

[11] Patent Number: 5,923,495
[45] Date of Patent: Jul. 13, 1999

[54] RECORDING AND/OR REPRODUCING APPARATUS WITH CONTROL MECHANISM FOR CONTROLLING MOVEMENT OF TAPE GUIDE MEMBERS

[75] Inventors: Hidetoshi Matsuoka; Junji Kobayashi, both of Tokyo, Japan

[73] Assignee: Canon Kabushiki Kaisha, Tokyo, Japan

[21] Appl. No.: 08/892,341

[22] Filed: Jul. 14, 1997

Related U.S. Application Data

[63] Continuation of application No. 08/577,737, Dec. 22, 1995, abandoned.

[30] Foreign Application Priority Data

Dec. 28, 1994 [JP] Japan .................................. 6-328490

[51] Int. Cl.$^6$ .................................................. G11B 5/027
[52] U.S. Cl. ............................................................ 360/85
[58] Field of Search ............................... 360/85, 95, 96.5

[56] References Cited

U.S. PATENT DOCUMENTS 4,985,789  1/1991  Kodama et al. ........................... 360/85
5,361,180  11/1994 Yamabuchi et al. ...................... 360/85
5,363,256  11/1994 Kobayashi ............................... 360/85
5,717,539  2/1998  Takada ..................................... 360/85

FOREIGN PATENT DOCUMENTS 61-211863  9/1986  Japan .
3-295052  12/1991  Japan .
6-60505  3/1994  Japan .
6-139655  5/1994  Japan .
6-243545  9/1994  Japan .

Primary Examiner—William J. Klimowicz
Attorney, Agent, or Firm—Robin, Blecker & Daley

[57] ABSTRACT

An apparatus for recording and/or reproducing information on and/or from a tape drawn from a cassette includes first and second tape guide members for guiding the tape drawn from the cassette, the first tape guide member bringing the tape into abutment with the head, and a control mechanism for, during tape loading, causing the first tape guide member to travel in a direction in which the tape is brought into abutment with the head, and also causing the second tape guide member to travel toward the cassette.

27 Claims, 7 Drawing Sheets

RECORDING AND/OR REPRODUCING APPARATUS WITH CONTROL MECHANISM FOR CONTROLLING MOVEMENT OF TAPE GUIDE MEMBERS

This is a continuation application under 37 CFR 1.62 of prior application Ser. No. 08/577,737, filed Dec. 22, 1995, now abandoned.

BACKGROUND OF THE INVENTION

1. Field of the Invention

The present invention relates to a recording and/or reproducing apparatus such as a VTR and, more particularly, to a control mechanism for controlling the movement of tape guide members, which is suitable for use with a pinch roller which travels in association with tape loading by the tape guide members.

2. Description of the Related Art

Some conventional types of VTRs are arranged to position a pinch roller and tape guide members, such as a tape drawing post, in the opening of a cassette during mounting thereof, perform the tape loading operation of drawing a tape from the opening of the cassette and wrapping of the tape around the periphery of a rotary drum through the travel of the tape guide members, and cause the pinch roller to travel from the opening of the cassette in association with that tape loading operation, to press the pinch roller against a capstan with the tape being retained therebetween.

In this arrangement, normally, the pinch roller is supported by a turnable arm and the aforesaid travelling operation of the pinch roller is carried out by the turning of the turnable arm.

It is known that the development of recent small-size VTRs has occasioned an increase in the complexity of a tape path within a limited space and an increase in the number of tape guide members.

The mainstream art adopted in such a small-size VTR, particularly a camera-integrated VTR, is to dispose a travelling chassis on a fixed chassis to which a rotary drum is secured, in such a manner that the travelling chassis can travel forward and backward. In this arrangement, when a cassette is mounted on the travelling chassis, the travelling chassis is made to travel forward in the direction of the rotary drum in association with the loading of a tape by tape guide members, whereby at least part of the rotary drum is relatively inserted into the opening of the cassette.

In this arrangement, during tape loading, if the pinch roller and the tape guide members, which are positioned in the small opening of the cassette, are not made to travel from the opening in the direction of tape loading at a predetermined timing, the pinch roller will hinder the movement of the tape guide members for drawing the tape.

In addition, to cope with the increase in the number of tape guide members, the position of the pinch roller in the opening of the cassette in which these tape guide members are positioned needs to be set within a predetermined range in which the pinch roller is prevented from interfering with the tape and the body of the cassette within the opening thereof.

SUMMARY OF THE INVENTION

It is, therefore, an object of the present invention to provide a recording and/or reproducing apparatus which is capable of preventing one tape guide member from hindering the movement of another tape guide member during the loading of a tape by the travel of the tape guide members.

To achieve the above-described object, according to one aspect of the present invention, there is provided an apparatus for recording and/or reproducing information on and/or from a tape drawn from a cassette, which comprises a head for recording and/or reproducing the information on and/or from the tape drawn from the cassette, first and second tape guide members for guiding the tape drawn from the cassette, the first tape guide member bringing the tape into abutment with the head, and control means for, during tape loading, causing the first tape guide member to travel in a direction in which the tape is brought into abutment with the head, and also causing the second tape guide member to travel toward the cassette.

According to another aspect of the present invention, there is provided an apparatus for recording and/or reproducing information on and/or from a tape drawn from a cassette, which comprises a first chassis, a second chassis capable of relatively travelling with respect to the first chassis, a head provided on the first chassis, for recording and/or reproducing the information from the tape drawn from the cassette, first and second tape guide members for guiding the tape drawn from the cassette, the first tape guide member bringing the tape into abutment with the head, the second tape guide member being provided on the second chassis, and control means for, during tape loading, causing the first tape guide member to travel in a direction in which the tape is brought into abutment with the head, and also causing the second tape guide member to travel toward the cassette.

The above and other objects, features and advantages of the present invention will become apparent from the following detailed description of a preferred embodiment of the present invention, taken in conjunction with the accompanying drawings.

DETAILED DESCRIPTION OF THE PREFERRED EMBODIMENT

Figure 1:
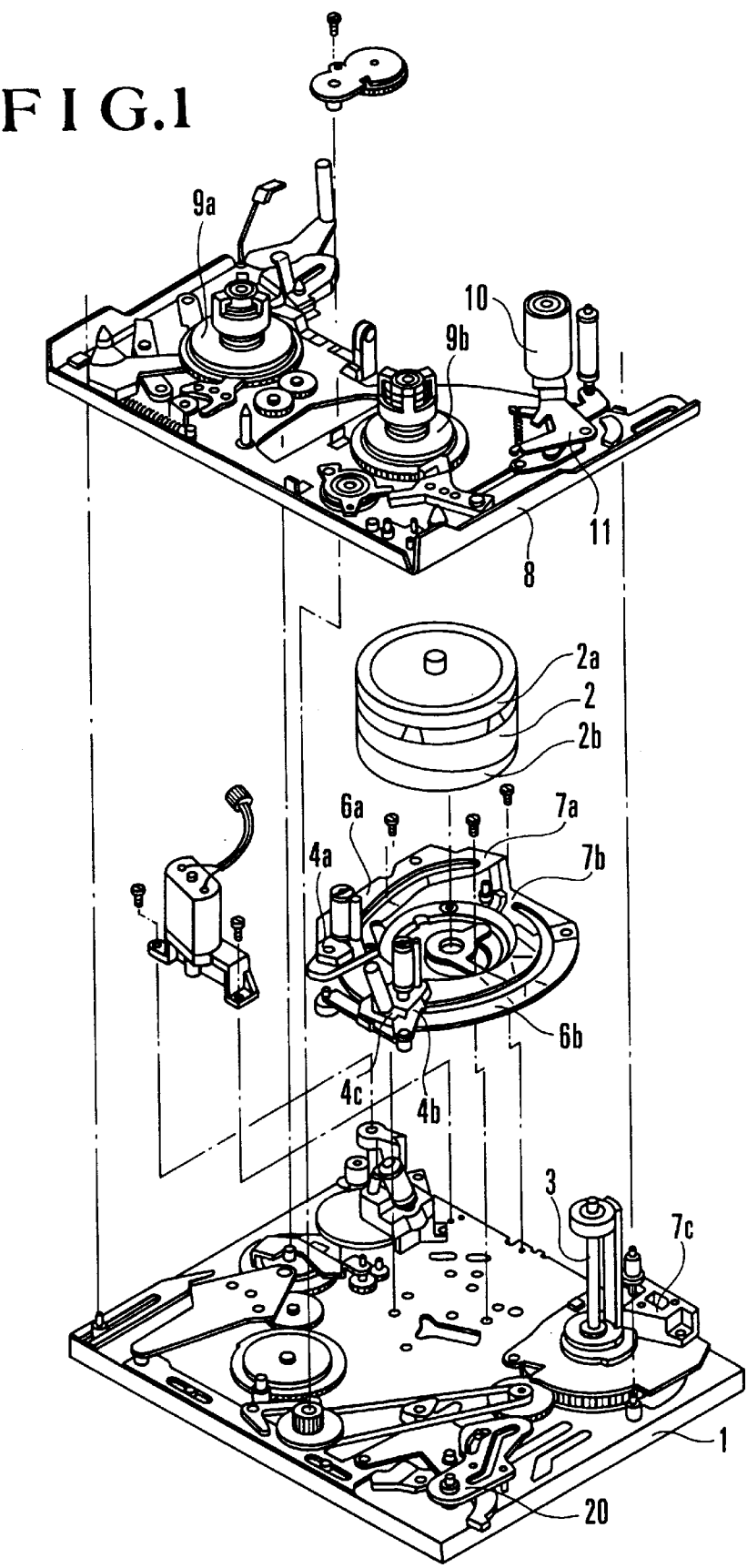
FIG. 1 is an exploded perspective view showing the entire construction of an apparatus according to one embodiment in which the present invention is applied to a VTR.
Figure 2:
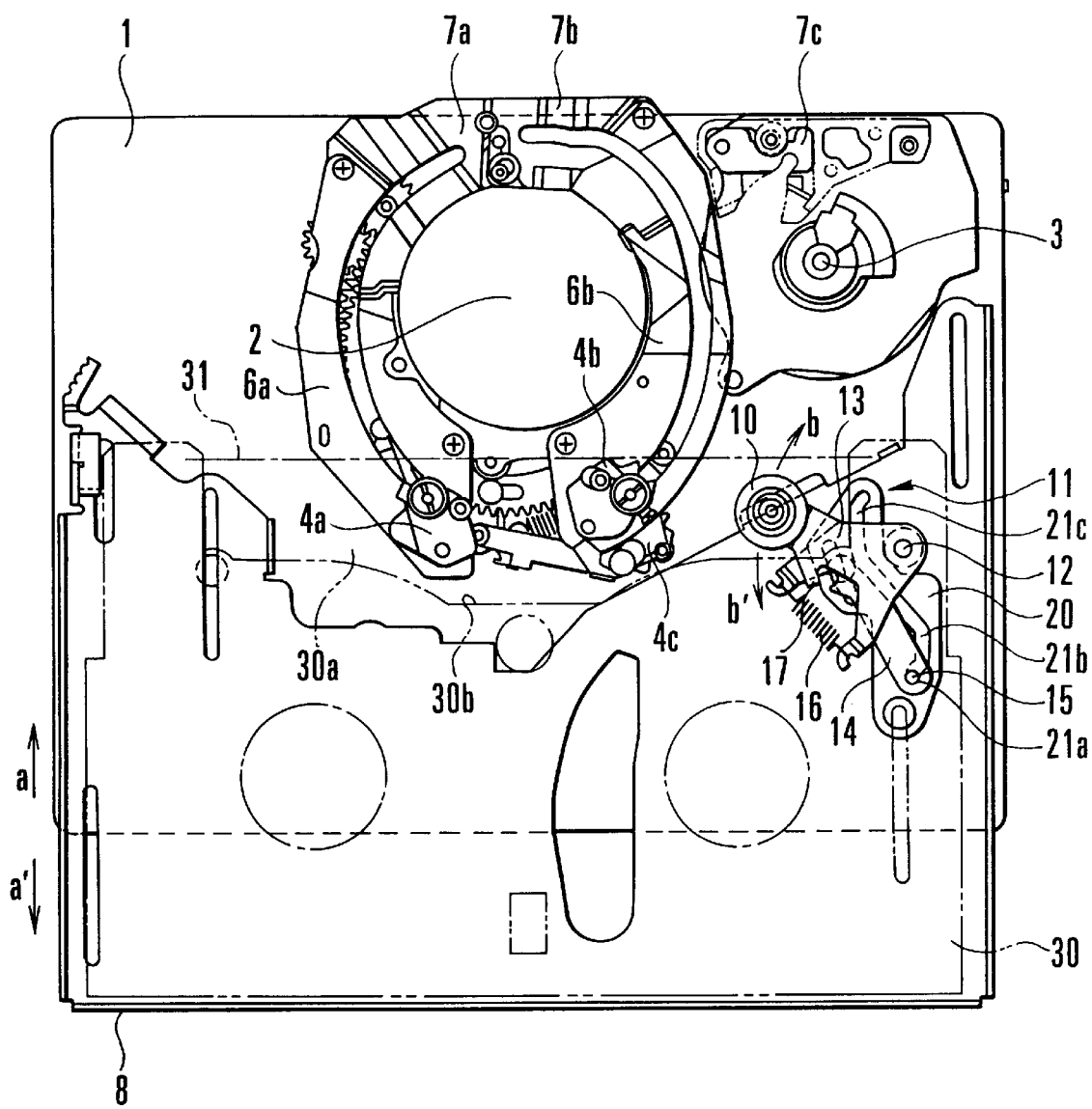
FIG. 2 is a diagrammatic top plan view of the entire construction of the apparatus.
Figure 3:
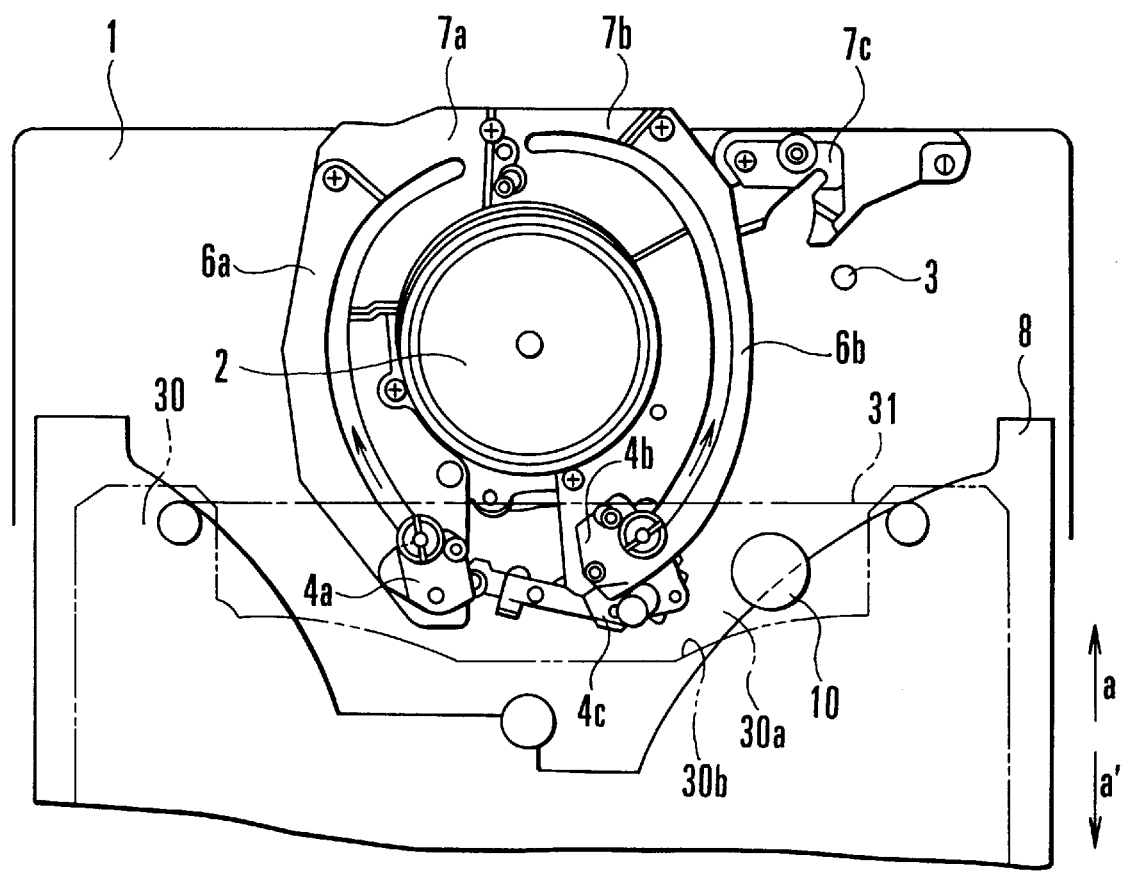
FIG. 3 is a diagrammatic top plan view showing the state in which tape is unloaded in the apparatus.
Figure 4:
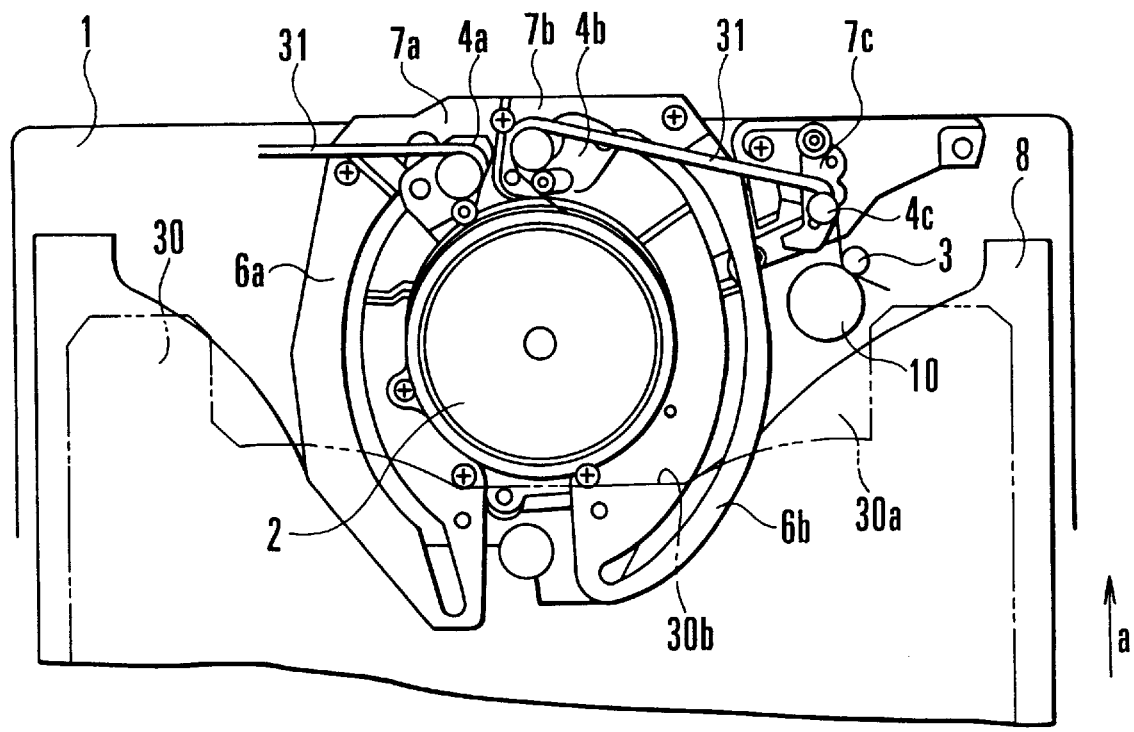
FIG. 4 is a diagrammatic top plan view showing the state in which tape is loaded in the apparatus.

A preferred embodiment of the present invention will be described below with reference to the accompanying drawings. FIG. 1 is an exploded perspective view showing the entire construction of the apparatus. FIG. 2 is a diagrammatic top plan view of the entire construction of the apparatus. FIG. 3 is a diagrammatic top plan view showing a tape-unloaded state. FIG. 4 is a diagrammatic top plan view showing a tape-loaded state.

Referring to FIGS. 1 and 2, a fixed chassis 1 is provided with a rotary drum unit 2 which includes a rotary drum 2a having recording and reproducing heads (not shown) and a fixed drum 2b which rotatably supports the rotary drum 2a, a capstan 3, tape guide members 4a, 4b and 4c, and other predetermined constituent elements. Each of the tape guide members 4a, 4b and 4c includes a guide post for drawing a magnetic tape 31 from an opening 30a of a cassette 30 and a post base which supports the guide post. The tape guide members 4a and the tape guide members 4b, 4c are respectively guided by guide rail members 6a and 6b and, upon completion of tape loading, the tape guide members 4a, 4b and 4c are respectively positioned by positioning members 7a, 7b and 7c.

A travelling chassis 8 is provided with a pair of reel bases 9a and 9b for engagement with a pair of reels provided in the cassette 30 mounted on the travelling chassis 8, as well as other predetermined constituent elements. The travelling chassis 8 is arranged to travel on the fixed chassis 1 forward and backward as indicated by arrows a and a', and during a tape loading operation the travelling chassis 8 is made to travel together with the cassette 30 forward as indicated by the arrow "a", i.e., toward the rotary drum unit 2. On the travelling chassis 8, a pinch roller arm (hereinafter referred to as the PR arm) 11 which supports a pinch roller 10 is supported in such a manner as to be able to turn about a shaft 12 in the opposite directions indicated by arrows b and b'.

As shown in FIG. 3, the cassette 30 is mounted on the travelling chassis 8 which is moved backward as indicated by the arrow "a" with respect to the fixed chassis 1. When the cassette 30 is mounted in this manner, the tape guide members 4a, 4b and 4c and the pinch roller 10 are relatively inserted into the opening 30a of the cassette 30.

When tape loading is initiated, the travelling chassis 8 is made to travel forward as indicated by the arrow "a", and the tape guide members 4a, 4b and 4c are made to travel so that the magnetic tape 31 is drawn from the opening 30a.

Then, as shown in FIG. 4, an approximate half of the rotary drum unit 2 is relatively inserted into the opening 30a, while the magnetic tape 31 is wrapped around the periphery of the rotary drum unit 2 by the tape guide members 4a and 4b and a predetermined tape path is formed by the tape guide member 4c. In association with this tape loading, the PR arm 11 turns to cause the pinch roller 10 to travel from the opening 30a, so that the pinch roller 10 is pressed against the capstan 3 with the magnetic tape 31 being retained therebetween.

Figure 5:
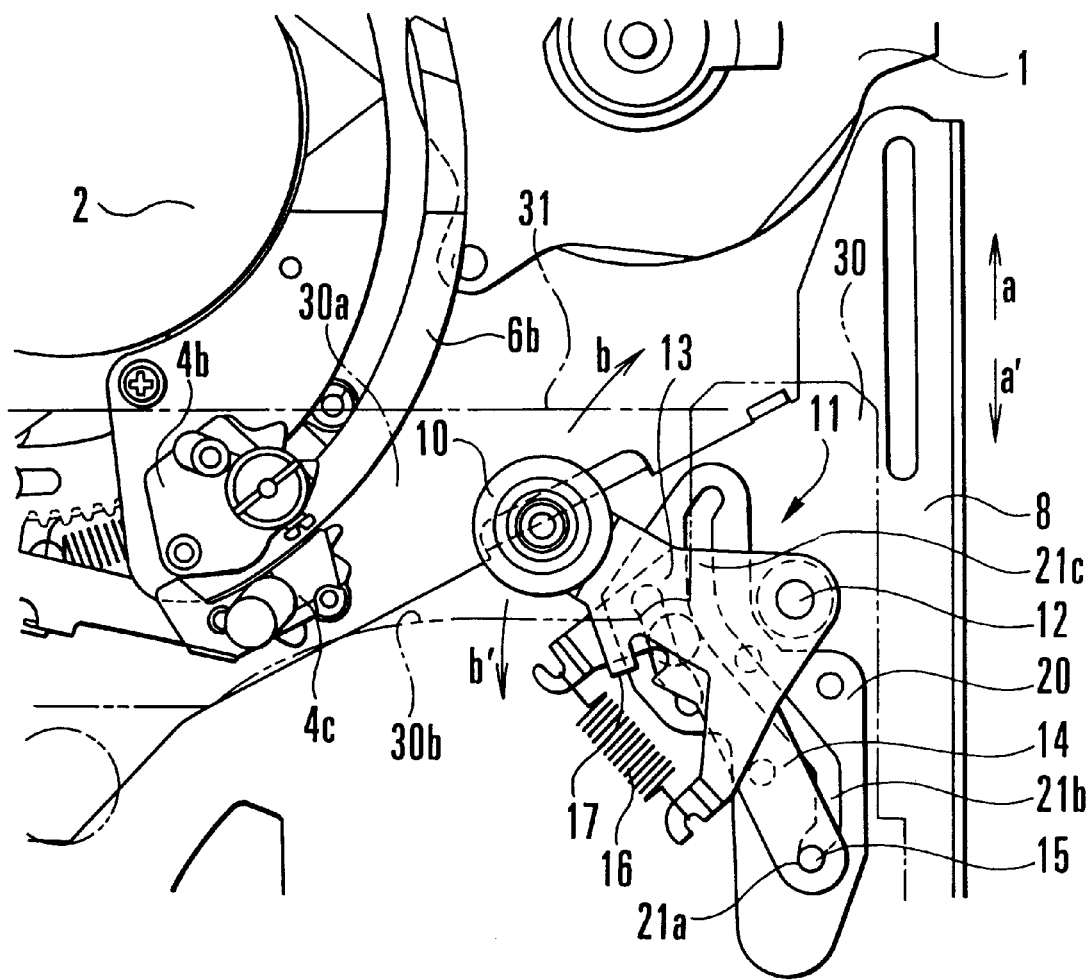
FIG. 5 is a top plan view showing the state of an essential portion with the cassette 30 being mounted.
Figure 6:
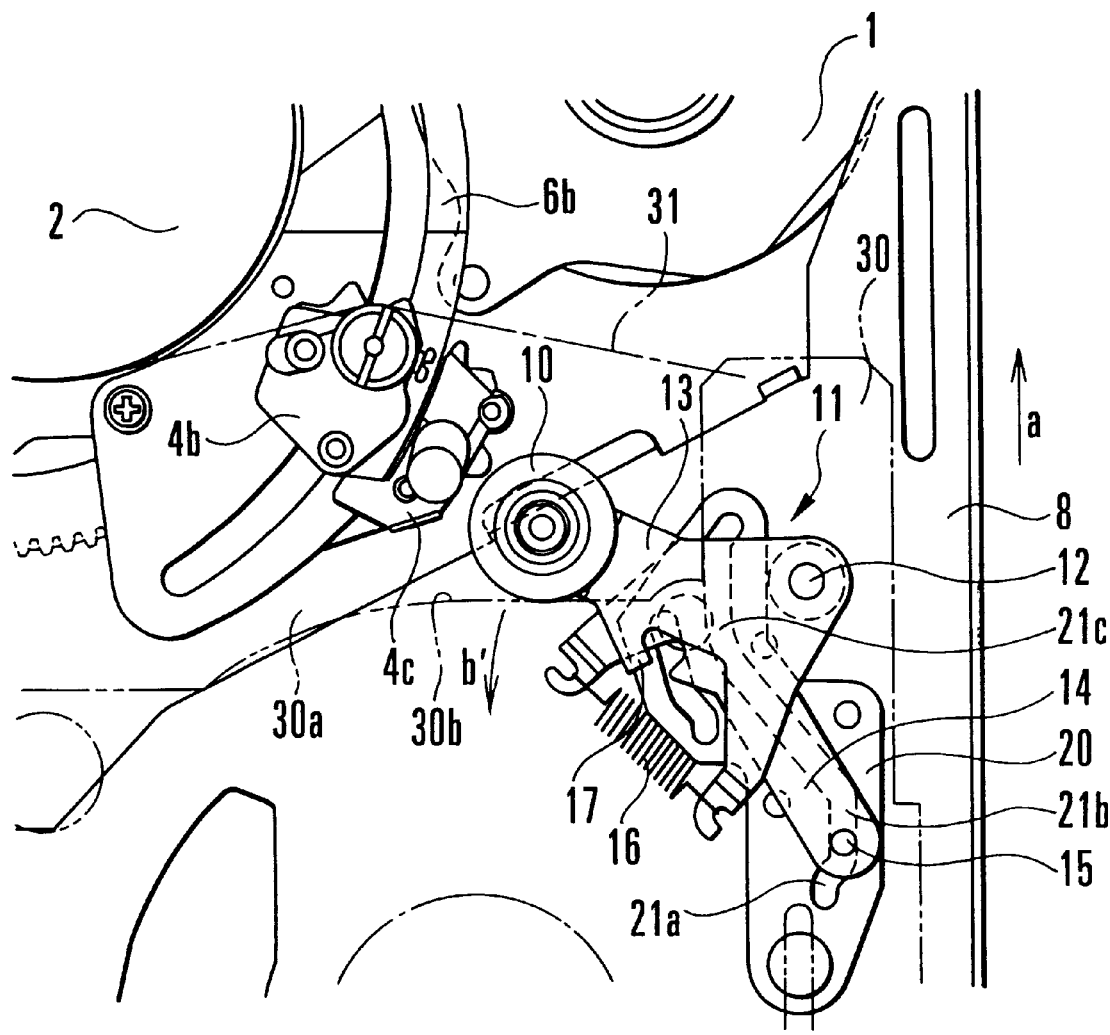
FIG. 6 is a top plan view showing the state of the essential portion immediately after the start of tape loading.
Figure 7:
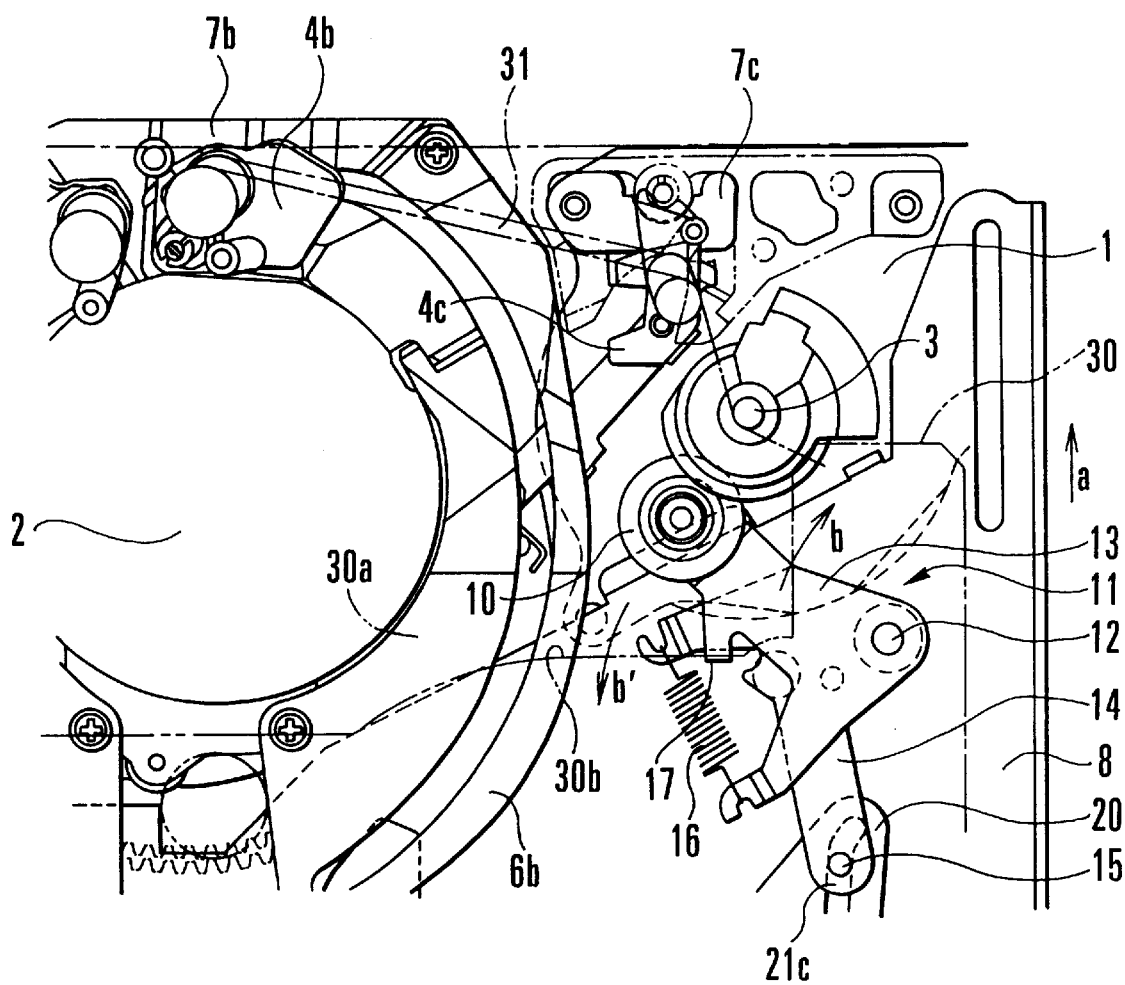
FIG. 7 is a top plan view showing the state of the essential portion immediately before the completion of the tape loading.

The PR arm 11 and a driving mechanism therefor will be described below. FIGS. 5 to 7 are top plan views of an essential portion, showing the positional relationships between the tape guide members 4b and 4c, the pinch roller 10 and the cassette 30 during tape loading. FIG. 5 shows the state of the essential portion with the cassette 30 being mounted, FIG. 6 shows the state of the essential portion immediately after the start of tape loading, and FIG. 7 shows the state of the essential portion immediately before the completion of the tape loading.

As shown in FIGS. 2 and 5 to 7, the PR arm 11 includes a first arm 13 and a second arm 14 which are coaxially supported by the shaft 12, and the pinch roller 10 is rotatably provided at one end of the first arm 13 and a pin 15 is provided at one end of the second arm 14. The first arm 13 is urged to turn in the direction of an arrow "b" with respect to the second arm 14, by a spring 16, whereas the turning of the first arm 13 is limited by the engagement between a stopper 17 provided on the first arm 13 and the second arm 14, whereby the urging force of the spring 16 serves as a force acting to press the pinch roller 10 against the capstan 3. In the following description, since the first arm 13 and the second arm 14 integrally (jointly) move except when the pinch roller 10 is pressed against the capstan 3, the arms 13 and 14 will be referred to collectively as the PR arm 11.

A PR-arm guide member 20 is provided on the fixed chassis 1 and serves as a turning-of-PR-arm limiting member for determining the position of the pinch roller 10 in association with the tape loading operation. The PR-arm guide member 20 has cam slots 21a to 21c which are continuously formed in the shape of extending longitudinally and being deviated laterally, and the pin 15 of the PR arm 11 is inserted though the travelling chassis 8 and is brought into slidable engagement with the cam slots 21a to 21c. The cam slots 21a to 21c may be directly formed in the fixed chassis 1.

During tape loading, in association with the forward travel of the travelling chassis 8 with respect to the fixed chassis 1, the pin 15 of the PR arm 11 is guided by the cam slots 21a to 21c of the PR-arm guide member 20 so that the PR arm 11 is turned and stopped, whereby the position of the pinch roller 10 is controlled.

The tape loading operation and the travelling operation of the pinch roller 10 in the VTR according to the present embodiment which is arranged in the above-described manner will be described below.

Referring first to FIG. 5 which shows the state in which the cassette 30 is mounted, since the travelling chassis 8 is moved back in the direction of the arrow "a'" with respect to the fixed chassis 1, the pin 15 of the PR arm 11 is positioned within the cam slot 21a of the PR-arm guide member 20. Thus, the PR arm 11 is set in its initial position and the pinch roller 10 is positioned at the approximately central location between a cassette body 30b and the magnetic tape 31 within the opening 30a of the cassette 30. Accordingly, during the mounting of the cassette 30 on the travelling chassis 8, the pinch roller 10 does not at all interfere with either of the cassette body 30b and the magnetic tape 31.

Then, as shown in FIG. 6, when tape loading is initiated by the movement of the tape guide members 4b and 4c, the pin 15 of the PR arm 11 is made to travel to the cam slot 21b of the PR-arm guide member 20 in association with the forward travel of the travelling chassis 8 in the direction of the arrow "a". Thus, the PR arm 11 is turned in the direction of an arrow "b'" which is a first direction, while the pinch roller 10 is made to travel toward the cassette body 30b within the opening 30a until the pinch roller 10 is brought into light abutment with the cassette body 30b.

At this time, since the travelling chassis 8 which supports the PR arm 11 is moved forward as indicated by the arrow "a" with respect to the fixed chassis 1 by the tape loading operation, the PR arm 11 is turned in the direction of the arrow "b'" with respect to the travelling chassis 8, so that the relative position of the pinch roller 10 is temporarily fixed with respect to the fixed chassis 1.

Thus, at the beginning of the tape loading, when the pinch roller 10 starts to travel together with the travelling chassis 8, the PR arm 11 is immediately turned in the direction opposite to the direction in which the travelling chassis 8 travels, so that the pinch roller 10 relatively decreases in travelling speed and substantially stops with respect to the fixed chassis 1. Accordingly, the tape guide members 4b and 4c are made to travel prior to the pinch roller 10 without interfering with the pinch roller 10, with the pinch roller 10 being retracted in the direction of tape unloading within the opening 30a.

Specifically, as sequentially shown in FIGS. 5 and 6, during the travel of the tape guide members 4b and 4c, the tape guide members 4b and 4c gradually travel toward the pinch roller 10 in association with the forward travel of the travelling chassis 8 in the direction of the arrow "a". As a result, if the pinch roller 10 is placed at the normal position shown in FIG. 5, the tape guide members 4b and 4c (particularly the tape guide member 4c) may interfere with the pinch roller 10. However, in the present embodiment, since the pinch roller 10 is retracted in the above-described manner, the pinch roller 10 does not at all hinder the movement of the tape guide members 4b and 4c. Incidentally, the pinch roller 10 has a small play due to the turning of the PR arm 11, but by bringing the pinch roller 10 into light abutment with the cassette body 30b at an intermediate time during tape loading, it is possible to suppress such play and it is also possible to prevent the pinch roller 10 from coming into contact with the tape guide members 4b and 4c and others.

Then, when the tape guide members 4b and 4c travel past the pinch roller 10, the pin 15 of the PR arm 11 is guided from the cam slot 21b to the cam slot 21c in association with the forward travel of the travelling chassis 8 in the direction of the arrow "a", whereby the PR arm 11 is turned in the direction of the arrow "b" which is a second direction, as shown in FIG. 7. Thus, the pinch roller 10 is made to travel away from the cassette body 30b, and is made to travel to the vicinity of the capstan 3 together with the travelling chassis 8.

After the pinch roller 10 has come into abutment with the capstan 3 with the magnetic tape 31 being retained therebetween, the PR arm 11 is made to travel forward to a small extent together with the travelling chassis 8. Thus, the first arm 13 is turned to a small extent in the direction of the arrow "b'" with respect to the second arm 14 against the spring 16, and the pinch roller 10 is pressed against the capstan 3 with an optimum force and angle by the spring 16. In this state, the magnetic tape 31 is made to run at a constant speed by the capstan 3 and the pinch roller 10 and desired information is recorded or reproduced on or from the magnetic tape 31 wrapped around the rotary drum unit 2, by the magnetic heads (not shown).

In the case of the unloading of the magnetic tape 31, an operation opposite to the above-described one is performed. Specifically, while the pinch roller 10 is retracted in the opening 30a immediately before the completion of tape unloading, the tape guide members 4b and 4c are made to travel backward, and thereafter the pinch roller 10 is returned to its initial position.

Although one embodiment of the present invention has been described above, the present invention is not limited to the above-described embodiment and various useful modifications and applications can be made on the basis of the technical idea of the present invention. For example, although the present embodiment adopts the arrangement in which the travelling chassis on which to mount a cassette is made to travel forward and backward on the fixed chassis, there is no need to necessarily employ such a structure having a travelling chassis. In the case of a structure having no travelling chassis, the function of limiting the turning of a pinch roller arm may be added to, for example, means for turning the pinch roller arm.

According to the above-described embodiment, during tape loading by tape guide members, an arm which supports a pinch roller is made to rotate in the first direction to cause the tape guide members to travel substantially prior to the pinch roller, whereby, even if the inner space of the opening of a cassette is small, the pinch roller does not at all hinder the movement of the tape guide members. Accordingly, it is possible to minimize the entire size of the apparatus. In addition, since the pinch roller is retracted in the opening of the cassette during the tape loading, the pinch roller, when the cassette is mounted, can be disposed at an optimum position where the pinch roller does not interfere with either of a tape and the body of the cassette in the opening.

In addition, since the cassette is mounted on a travelling chassis which can travel forward and backward on a fixed chassis, even if the space of the opening of the cassette is made far smaller by the relative insertion of a rotary drum into the opening, it is possible to prevent the above-described hindrance from being caused by the pinch roller. In addition, since a turning-of-arm limiting member is provided on the fixed chassis, it is possible to limit the turning of the arm in association with the forward travel of the travelling chassis, by means of an extremely simple structure.

What is claimed is:

1. An apparatus for recording and/or reproducing information on and/or from a tape drawn from a cassette, comprising:
   (a) a head for recording and/or reproducing the information on and/or from the tape drawn from the cassette;
   (b) first and second tape guide members for guiding the tape drawn from the cassette, said first tape guide member bringing the tape into abutment with said head; and
   (c) control means for, during movement of said tape from a condition of not being drawn from said cassette to a condition of being drawn into abutment with said head, causing said first tape guide member to travel in a direction in which the tape is brought into abutment with said head, and also causing said second tape guide member to move once in a direction toward the cassette and then move in a direction to depart from the cassette while the first tape guide member is continuing movement in a direction to draw out the tape.

2. An apparatus according to claim 1, wherein said control means causes said first tape guide member to travel substantially prior to said second tape guide member and, after causing said second tape guide member to travel toward the cassette, causes said second tape guide member to travel away from the cassette.

3. An apparatus according to claim 1, wherein said control means causes said second tape guide member to travel toward the cassette to bring said second tape guide member into abutment with the cassette.

4. An apparatus according to claim 1, wherein when the cassette is mounted in said apparatus, said first and second tape guide members are positioned in an area surrounded by the tape and an opening of the cassette.

5. An apparatus according to claim 4, wherein said control means causes said second tape guide member to travel toward the cassette to bring said second tape guide member into abutment with the cassette.

6. An apparatus according to claim 5, wherein said second tape guide member is a pinch roller.

7. An apparatus according to claim 1, wherein said second tape guide member is a pinch roller.

8. An apparatus according to claim 7, wherein said pinch roller is provided on a rotary unit.

9. An apparatus according to claim 8, wherein said control means includes a pin provided on said rotary unit and a cam slot with which said pin is engaged.

10. An apparatus according to claim 9, wherein said rotary unit includes a first member provided with said pinch roller and a second member provided with said pin, and said first member and said second member are connected by an elastic member.

11. An apparatus for recording and/or reproducing information on and/or from a tape drawn from a cassette, comprising:
   (a) a first chassis;
   (b) a second chassis capable of relatively traveling with respect to said first chassis;
   (c) a head provided on said first chassis, for recording and/or reproducing the information from the tape drawn from the cassette;
   (d) first and second tape guide members for guiding the tape drawn from the cassette, said first guide member bringing the tape into abutment with said head, said second tape guide member being provided on said second chassis; and
   (e) control means for, during movement of said tape from a condition of not being drawn from said cassette to a condition of being drawn into abutment with said head, causing said first tape guide member to travel in a direction in which the tape is brought into abutment with said head, and also causing said second tape guide member to move once in a direction toward the cassette and then to move in a direction to depart from the cassette while the first tape guide member is continuing movement in a direction to draw out the tape.

12. An apparatus according to claim 11, wherein said control means causes said first tape guide member to travel substantially prior to said second tape guide member and, after causing said second tape guide member to travel toward the cassette, causes said second tape guide member to travel away from the cassette.

13. An apparatus according to claim 11, wherein said control means causes said second tape guide member to travel toward the cassette to bring said second tape guide member into abutment with the cassette.

14. An apparatus according to claim 11, wherein when the cassette is mounted in said apparatus, said first and second tape guide members are positioned in an area surrounded by the tape and an opening of the cassette.

15. An apparatus according to claim 14, wherein the cassette is mounted on said second chassis.

16. An apparatus according to claim 14, wherein said control means causes said second tape guide member to travel toward the cassette to bring said second tape guide member into abutment with the cassette.

17. An apparatus according to claim 16, wherein said second tape guide member is a pinch roller.

18. An apparatus according to claim 11, wherein said second tape guide member is a pinch roller.

19. An apparatus according to claim 18, wherein said pinch roller is provided on a rotary unit.

20. An apparatus according to claim 19, wherein said control means includes a pin provided on said rotary unit and a cam slot with which said pin is engaged.

21. An apparatus according to claim 20, wherein said rotary unit includes a first member provided with said pinch roller and a second member provided with said pin, and said first member and said second member are connected by an elastic member.

22. An apparatus according to claim 19, wherein said rotary unit is provided on said second chassis.

23. An apparatus according to claim 20, wherein said cam slot is provided in said first chassis.

24. An apparatus for recording and/or reproducing information on and/or from a tape drawn from a cassette, comprising:
   (a) a head for recording and/or reproducing the information on and/or from the tape drawn from the cassette;
   (b) first and second tape guide members for guiding the tape drawn from the cassette; and
   (c) control means for, during movement of said tape from a condition of not being drawn from said cassette to a condition of being drawn into abutment with said head, causing said first tape guide member to travel in a direction in which the tape is brought into abutment with said head, and also causing said second tape guide member to have first and second different sense movements wherein said second tape guide member is caused to move once in a direction toward the cassette and then to move in a direction to depart from the cassette while the first tape guide member is continuing movement in a direction to draw out the tape.

25. An apparatus according to claim 24, wherein said first and second different sense movements are at least in part respectively counterclockwise and clockwise.

26. An apparatus according to claim 24, wherein said second tape guide member is a pinch roller.

27. An apparatus for recording and/or reproducing information on and/or from a tape drawn from a cassette, comprising:
   (a) a head for recording and/or reproducing the information on and/or from the tape drawn from the cassette;
   (b) first and second tape guide members for guiding the tape drawn from the cassette, respective first parts of loci of movement of said first and second guide members being coincident along a portion of each thereof; and
   (c) control means for, during movement of said tape from a condition of not being drawn from said cassette to a condition of being drawn into abutment with said head, causing one of said first and second tape guide members to move into a portion of said movement loci thereof other than said first locus part thereof when the other of said first and second tape guide members is moved into said first locus part thereof, said other of said first and second tape guide members traveling in a direction in which the tape is brought into abutment with said head and said one of said first and second tape guide members moving once in a direction toward the cassette and then moving in a direction to depart from the cassette while said other of said first and second tape guide members is continuing movement in a direction to draw out the tape.

* * * * *